(12) United States Patent  (10) Patent No.: US 12,450,223 B2
Horstman et al.  (45) Date of Patent: Oct. 21, 2025

(54) INTELLIGENT PROCESSING ENGINE FOR ACQUISITION, STORAGE, AND SUBSEQUENT REFRESH OF DATA FROM A DISTRIBUTED NETWORK

(71) Applicant: BANK OF AMERICA CORPORATION, Charlotte, NC (US)

(72) Inventors: Michael G. Horstman, Chicago, IL (US); Ganesh Bonda, Charlotte, NC (US); Manu Jacob Kurian, Dallas, TX (US); Jayachandra Varma, Irving, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 130 days.

(21) Appl. No.: 18/093,886

(22) Filed: Jan. 6, 2023

(65) Prior Publication Data
US 2024/0232162 A1 Jul. 11, 2024

(51) Int. Cl.
G06F 16/23 (2019.01)
G06F 11/34 (2006.01)
G06F 16/25 (2019.01)
G06F 16/28 (2019.01)

(52) U.S. Cl.
CPC ...... *G06F 16/2358* (2019.01); *G06F 11/3409* (2013.01); *G06F 16/258* (2019.01); *G06F 16/285* (2019.01)

(58) Field of Classification Search
CPC ............ G06F 16/2358; G06F 11/3409; G06F 16/258; G06F 16/285
See application file for complete search history.

(56) References Cited

U.S. PATENT DOCUMENTS

| | | |
|---|---|---|
| 9,449,047 B2 | 9/2016 | Babkin et al. |
| 10,235,625 B1 | 3/2019 | Walters et al. |
| 10,503,611 B1 | 12/2019 | Srivastav et al. |
| 10,572,296 B2 | 2/2020 | Haughwout et al. |
| 11,119,980 B2 | 9/2021 | Szczepanik et al. |
| 11,176,106 B2 | 11/2021 | Lin et al. |
| 11,321,338 B2 | 5/2022 | Okorafor et al. |
| 11,397,744 B2 | 7/2022 | Wan et al. |

(Continued)

*Primary Examiner* — Nanci N Wong
(74) *Attorney, Agent, or Firm* — Moore & Van Allen PLLC; Gabrielle M. Carlini

(57) ABSTRACT

Systems, computer program products, and methods are described herein for an intelligent processing engine for acquisition, storage, and subsequent refresh of data from a distributed network. The present invention is configured to receive, from one or more distributed computing systems, an enterprise dataset; convert the enterprise dataset to a standardized format; store the enterprise dataset in one or more storage locations based on a characteristic of the enterprise dataset; provide the one or more distributed computing systems with remote access to the one or more storage locations; monitor, via an artificial intelligence engine, usage data from the one or more distributed computing systems, wherein the usage data is associated with remote access of the one or more storage locations; generate, via the artificial intelligence engine, a use score associated with the one or more storage locations; and automatically refresh the one or more storage locations based on the use score.

20 Claims, 5 Drawing Sheets

(56) References Cited

U.S. PATENT DOCUMENTS

| | | | |
|---|---|---|---|
| 11,514,304 B2 | 11/2022 | Wu | |
| 11,715,051 B1 * | 8/2023 | Baskaran | G06N 5/04 |
| | | | 707/758 |
| 11,907,402 B1 * | 2/2024 | Bandyopadhyay | G06F 16/25 |
| 2012/0179663 A1 | 7/2012 | Haudenschild et al. | |
| 2013/0290223 A1 | 10/2013 | Chapelle et al. | |
| 2017/0063627 A1 | 3/2017 | Viswanathan et al. | |
| 2017/0132300 A1 | 5/2017 | Sekar | |
| 2018/0095952 A1 | 4/2018 | Rehal | |
| 2018/0101584 A1 | 4/2018 | Pattnaik et al. | |
| 2018/0121476 A1 | 5/2018 | Bakke et al. | |
| 2018/0373781 A1 | 12/2018 | Palrecha | |
| 2020/0250172 A1 | 8/2020 | Busjaeger et al. | |
| 2021/0224339 A1 | 7/2021 | Crudele et al. | |
| 2022/0383283 A1 | 12/2022 | Rangaswamy | |
| 2024/0248886 A1 * | 7/2024 | Zhang | G06F 16/2246 |

* cited by examiner

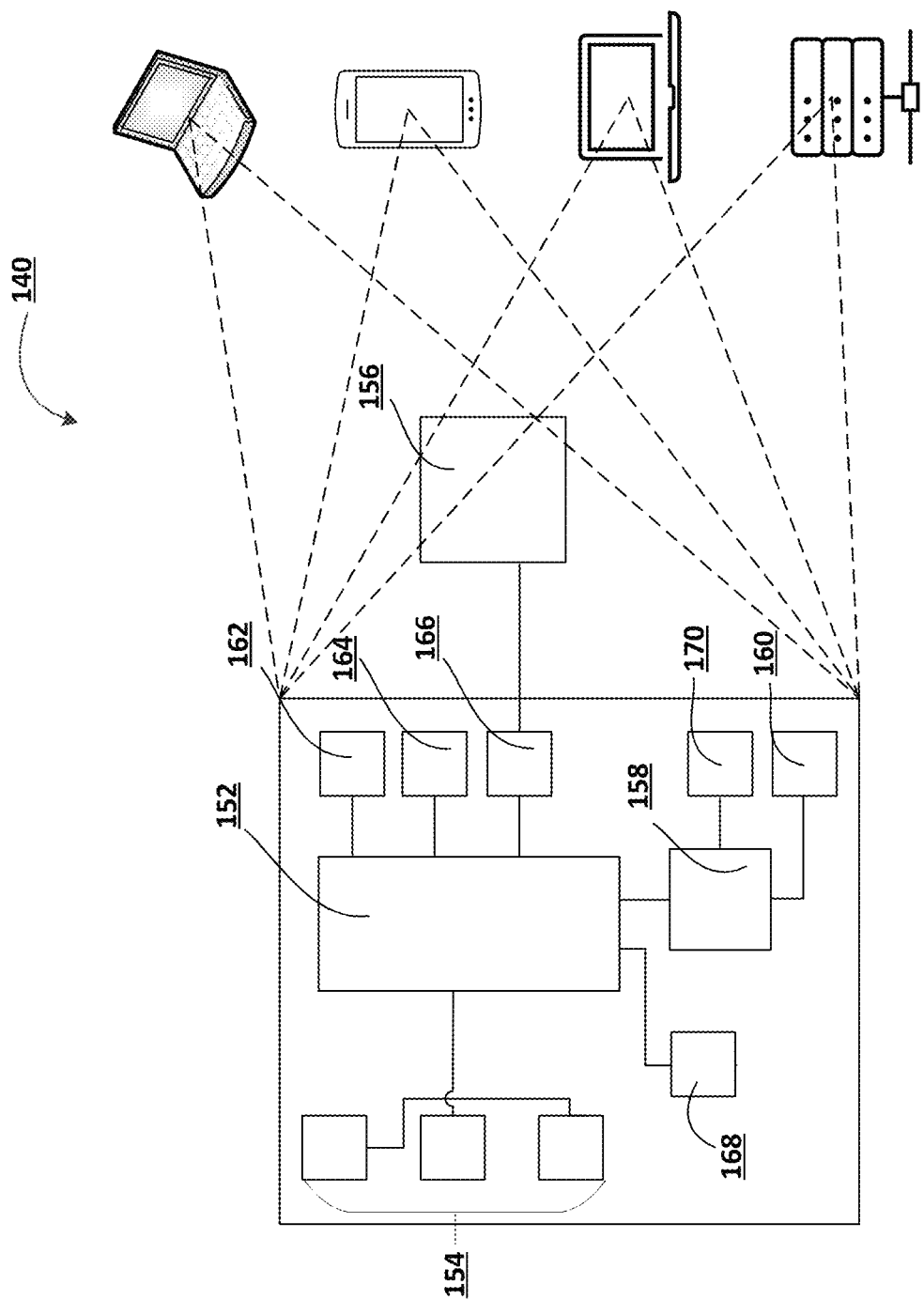

INTELLIGENT PROCESSING ENGINE FOR ACQUISITION, STORAGE, AND SUBSEQUENT REFRESH OF DATA FROM A DISTRIBUTED NETWORK

FIELD OF THE INVENTION

The present invention embraces an intelligent processing engine for acquisition, storage, and subsequent refresh of data from a distributed network.

BACKGROUND

In conventional data acquisition and storage systems, data usage is not monitored after initial acquisition and storage. This creates system inefficiencies, where computing resources are dedicated to refreshing and maintaining said data even when systems or users have little or no use for said data. As such, there is a need for a system for intelligent processing and storage of distributed data.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for intelligent processing of distributed data is presented. The system may include at least one non-transitory storage device and at least one processor coupled to the at least one non-transitory storage device, where the at least one processor is configured to: receive, from one or more distributed computing systems, an enterprise dataset; convert the enterprise dataset to a standardized format; store the enterprise dataset in one or more storage locations based on a characteristic of the enterprise dataset; generate, via an artificial intelligence engine, a use score associated with the one or more storage locations; and automatically refresh the one or more storage locations based on the use score.

In some embodiments, receiving, from the one or more distributed computing systems, the enterprise dataset further includes querying the one or more distributed computing systems based on an output of the artificial intelligence engine.

In some embodiments, converting the enterprise dataset to a standardized data format further includes identifying one or more data subsets contained within the enterprise dataset and assigning the one or more data subsets to one or more data categories.

In some embodiments, the system further includes storing the enterprise datasets in the one or more storage locations based on the one or more data categories.

In some embodiments, the system further includes providing the one or more distributed computing systems with remote access to the one or more storage locations via a network.

In some embodiments, the system further includes monitoring, via the artificial intelligence engine, usage data from the one or more distributed computing systems, wherein the usage data is associated with remote access of the one or more storage locations.

In some embodiments, the use score associated with the one or more storage locations is generated based on the usage data.

In some embodiments, automatically refreshing the one or more storage locations based on the use score further includes increasing a refresh frequency based on a value of the use score.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
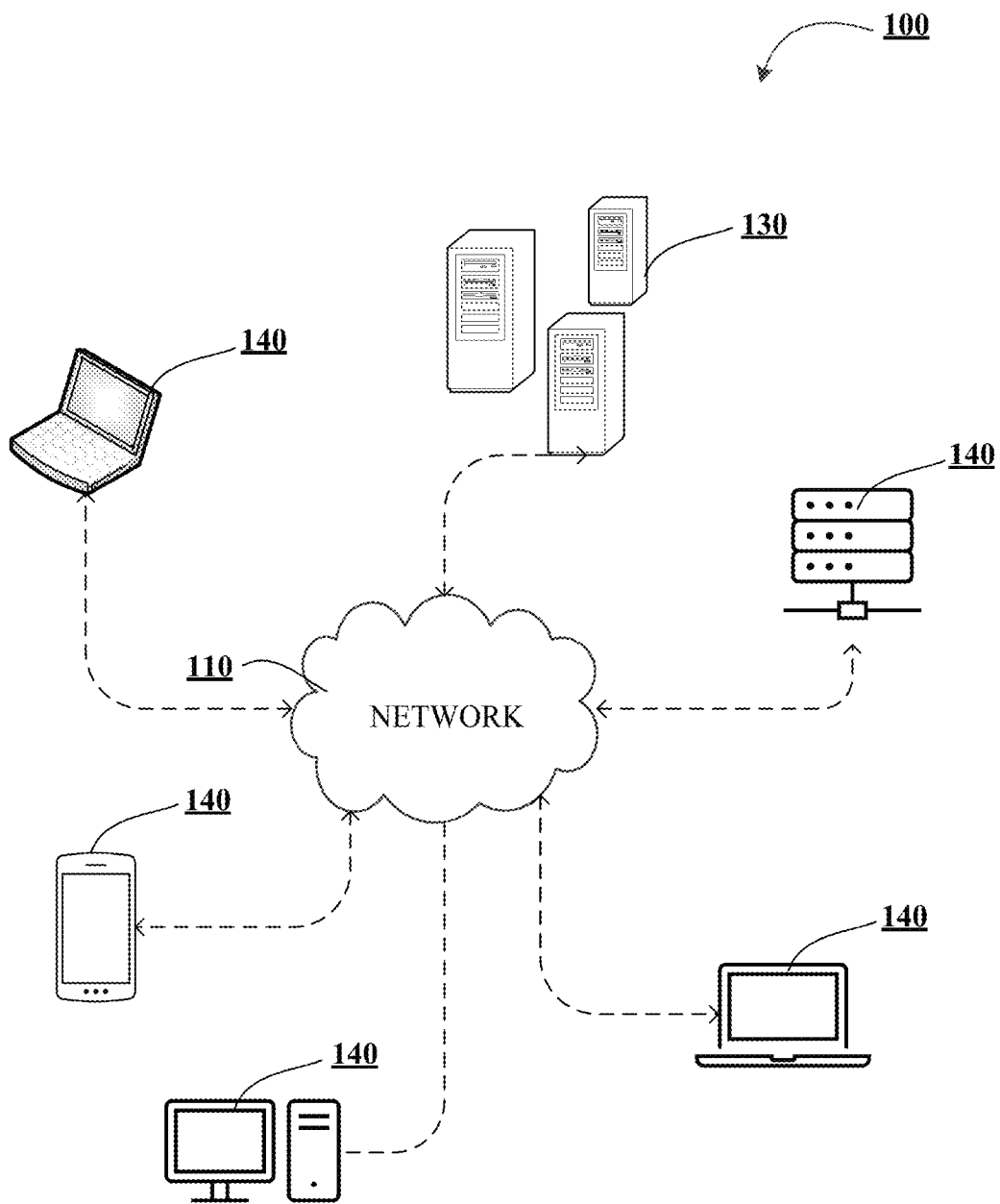
Figure 1B:
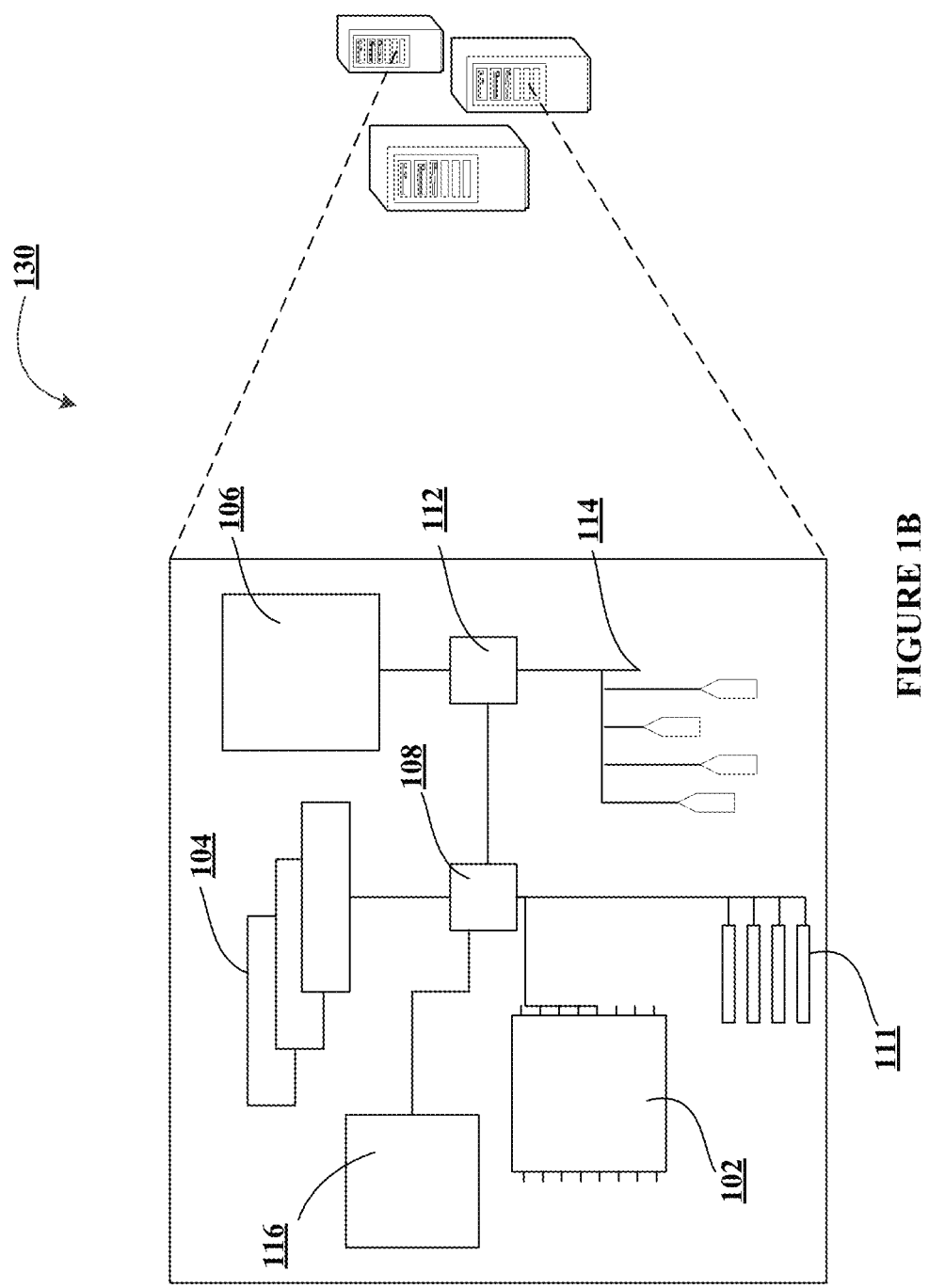
Figure 2:
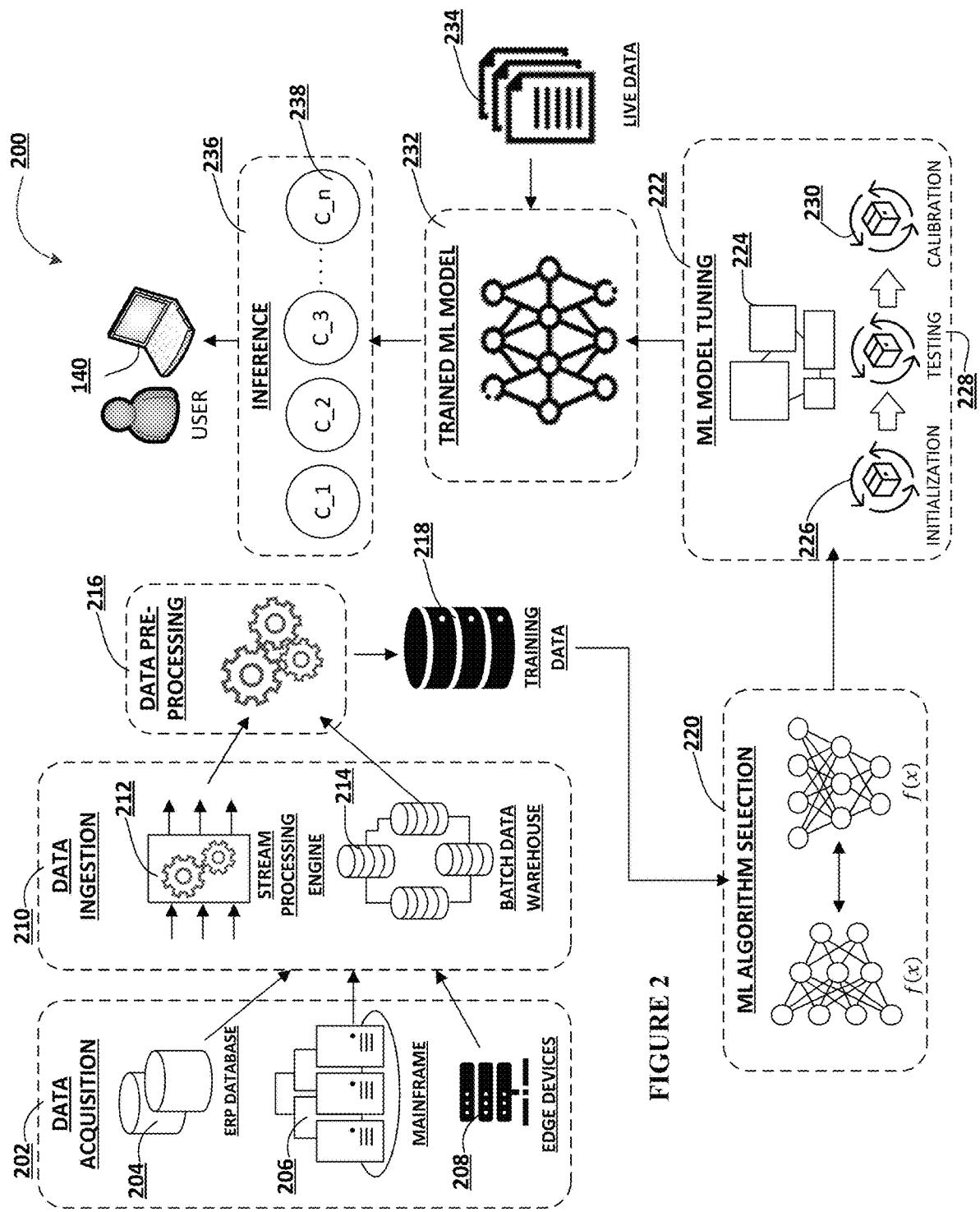
Figure 3:
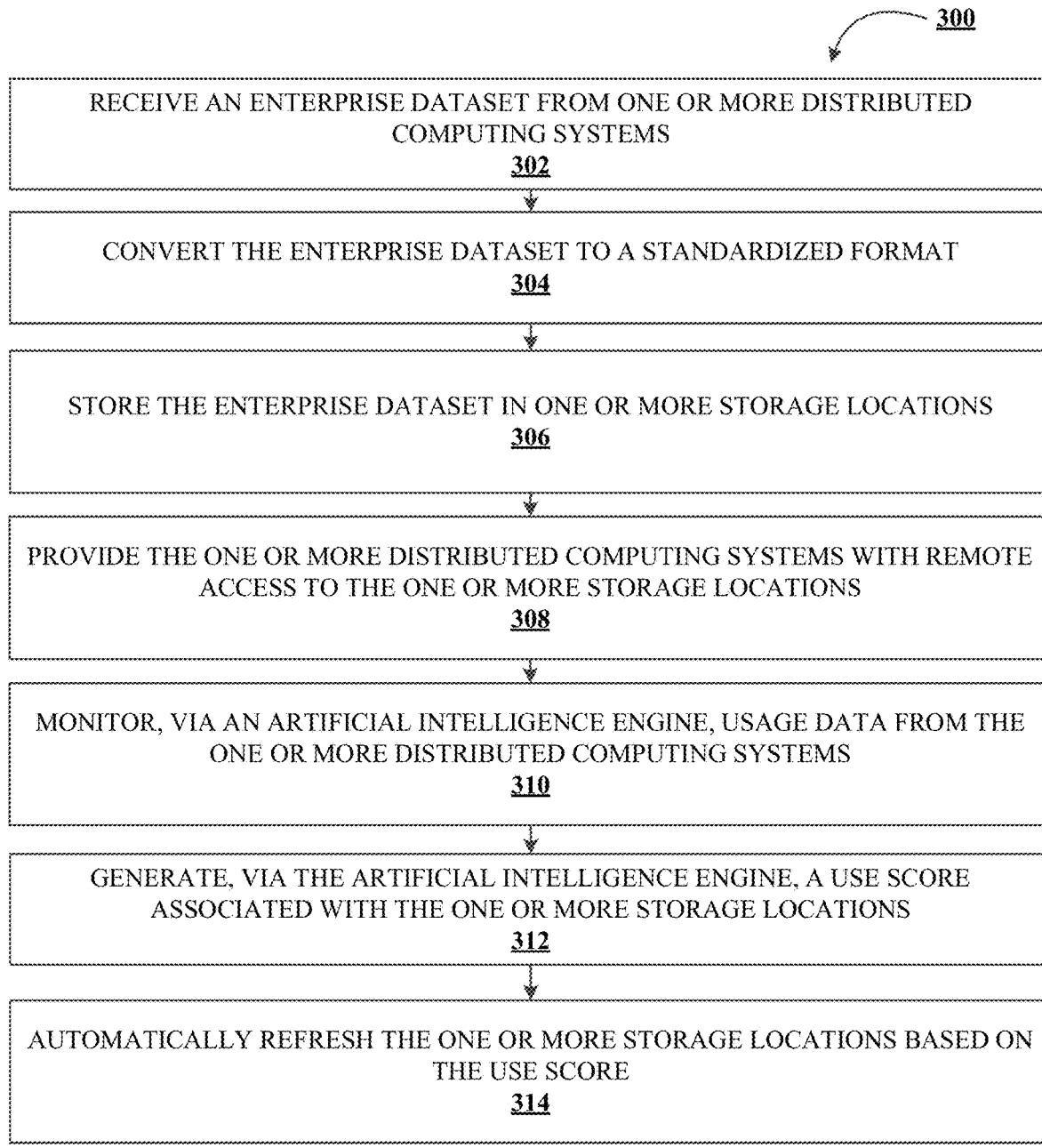

Having thus described embodiments of the invention in general terms, reference will now be made the accompanying drawings, wherein:

FIGS. 1A-1C illustrate technical components of an exemplary distributed computing environment for intelligent processing of distributed data, in accordance with an embodiment of the invention;

FIG. 2 illustrates an exemplary machine learning (ML) subsystem architecture 200, in accordance with an embodiment of the invention; and FIG. 3 illustrates a process flow for intelligent processing of distributed data, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data. "Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In conventional data acquisition and storage systems, data usage is not monitored after initial acquisition and storage. This creates system inefficiencies, where computing resources are dedicated to refreshing and maintaining said data even when systems or users have little or no use for the data. As such, there is a need for a system for intelligent processing and storage of distributed data. The present system allows for use of a machine learning engine, or artificial intelligence engine, to monitor usage of data which is distributed in a variety of storage locations according to various characteristics of the data. By determining which data types are most frequently accessed, the system may enable intelligent data refresh, causing more useful data to be updated more frequently than less commonly used data. Because of the large number of computational resources required to actively acquire data (for example, by scraping the Internet, etc.), the present system is able to realize significant efficiency gains.

Accordingly, the present invention is configured to receive, from one or more distributed computing systems, an enterprise dataset; convert the enterprise dataset to a standardized format; store the enterprise dataset in one or more storage locations based on a characteristic of the enterprise dataset; provide the one or more distributed computing systems with remote access to the one or more storage locations; monitor, via an artificial intelligence engine, usage data from the one or more distributed computing systems, wherein the usage data is associated with remote access of the one or more storage locations; generate, via the artificial intelligence engine, a use score associated with the one or more storage locations; and automatically refresh the one or more storage locations based on the use score.

What is more, the present invention provides a technical solution to a technical problem. As described herein, the technical problem includes an inability for distributed computing systems to dynamically alter a data refresh rate after distribution to a remote storage location. The technical solution presented herein allows for distributed computing systems to share data usage information in real time in a standardized format. In particular, the real-time usage monitoring of distributed data storage locations is an improvement over existing solutions because it provides a more accurate solution to the problem, thus reducing the number of resources required to remedy any errors made due to a less accurate solution. In addition, the present invention removes manual input and waste from the implementation of the solution, thus improving speed and efficiency of the process and conserving computing resources. Furthermore, the present invention determines an optimal amount of resources that need to be used to implement the solution, thus reducing network traffic and load on existing computing resources. Finally, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for intelligent processing of distributed data 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the system 130 may transmit and/or receive information or commands to and from the end-point device(s) 140 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require a user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include databases that host data related to software architecture (i.e. software component level interactions related to day-to-day business activities such as accounting, procurement, project management, exposure management, supply chain operations, and/or the like), a mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for a system for intelligent processing of distributed data, in accordance with an embodiment of the present invention. The process may begin in block 302, where the system may receive an enterprise dataset from one or more distributed computing systems (i.e. end-point devices 140). In some embodiments, the system may receive an enterprise dataset by actively querying an end-point device for data (e.g. by "scraping" an application or Web page for particular text and/or image data). In some embodiments, the system may query for enterprise datasets based on an output of an artificial intelligence engine as is discussed in greater detail with respect to block 314. The system may receive an enterprise dataset after establishing a remote access communication channel with an end-point device 140. The system may establish said communication channel in response to receiving a request from the end-point device. Additionally or alternatively, the system may transmit a request for remote access to the end-point device, and the communication channel may be established in response to a user acceptance of the request.

The enterprise dataset may comprise user data, usage data, and/or any data related to a particular product/service of a managing entity system or merchant system. For example, an enterprise dataset may contain product reviews, ratings, questions, and/or discussions relating to a particular product. Additionally or alternatively, the enterprise dataset may contain information related to the use of a product/service, such as a number of active users and/or information identifying active users of the product/service. In some embodiments, the system may automatically receive updated enterprise datasets based on a predetermined parameter, such as daily or hourly updates. Additionally or alternatively, the system may automatically receive updated resource usage data in real time based on an output of an artificial intelligence engine as is discussed in greater detail with respect to block 314. In some embodiments, each distributed computing system of the plurality of distributed computing systems may associated with a merchant system and/or with a user device.

The process flow may then continue to block 304, where the system may convert the enterprise dataset to a standardized format. For example, the system may identify one or more data subsets contained within the enterprise dataset and assign the one or more data subsets to one or more data categories (e.g. by data source (e.g. merchant website, social media, chat logs, etc.), by product/service, by user, by data type (e.g. ratings, questions, images, etc.)) and may convert quantitative data to standard values (i.e. converting numerical values into percentage values, etc.). The enterprise dataset as a whole may be assigned to one or more categories, and/or individual data subsets of the enterprise dataset may be individually assigned to one or more categories.

In some embodiments, the system may assign the enterprise dataset to one or more data categories via an artificial intelligence engine. The features and functions of the artificial intelligence engine are discussed in greater detail with respect to FIG. 2. For example, the artificial intelligence engine may determine, based on a combination of natural language processing and historical user activity, that a text file should be assigned to a particular product category, as well as a product review category. In some embodiments, the system and/or a third-party merchant system may define a predetermined set of categories. Additionally or alternatively, the artificial intelligence system may generate categories subject to a set of parameters established by the system and/or third-party merchant system.

The process flow may then continue to block 306, where the system stores the enterprise dataset in one or more storage locations based on a characteristic of the enterprise dataset. In some embodiments, the system may store the enterprise datasets in the one or more storage locations based on the one or more data categories. As such, each enterprise dataset and/or enterprise data subset may be stored in a plurality of locations according to multiple characteristics or categories. In some embodiments, the one or more storage locations correspond to distributed computing systems, such as end-point devices. Additionally or alternatively, the one or more storage locations may comprise various databases or datastores within one or more storage devices.

The process flow may then continue to block 308, where the system provides the one or more distributed computing systems with remote access to the one or more storage locations via a network. As such, a user of an endpoint device may be able to remotely access an enterprise dataset and/or a portion of an enterprise dataset in response to a query. In some embodiments, the one or more distributed computing systems may use the enterprise data to generate enterprise insights, perform data analysis, generate a report, and/or the like.

The process flow may then continue to block 310, where the system may monitor, via the artificial intelligence engine, usage data from the one or more distributed computing systems. In some embodiments the usage data is associated with remote access of the one or more storage locations. For example, the artificial intelligence engine may monitor the frequency with which particular storage locations are accessed, and/or the frequency which with particular data types are used by the one or more distributed computing systems. The artificial intelligence engine may also monitor usage data other than access frequency, such as duration of access, user information, software applications associated with data usage, and/or the like.

The process flow may then continue to block 312, where the system may generate, via the artificial intelligence engine, a use score associated with the one or more storage locations. Specifically, in some embodiments, the use score associated with the one or more storage locations may be generated based on the usage data. For example, the system may assign a high use score to storage locations contained the most frequently accessed data and/or the storage locations which are typically accessed for the longest periods of time. In contrast, the system may assign a low use score to storage locations which are rarely accessed, or storage locations which, when accessed, contain data which is not frequently analyzed.

The process flow may then continue to block 314, where the system automatically refreshes the one or more storage locations based on the use score. In some embodiments, automatically refreshing the one or more storage locations based on the use score further comprises increasing a refresh frequency based on a value of the use score. For example, in some embodiments, the system may determine that the use score is above a predetermined threshold value. The predetermined threshold may be a binary value such as 0 or 1 or may reflect a confidence percentage of the artificial intelligence engine. In some embodiments, the predetermined threshold value may vary by storage location or by distributed computing system and may be determined by the system or by a third party merchant system. The system may then increase a refresh frequency if the use score is above the predetermined threshold value, and/or may decrease the refresh frequency if the use score is below the predetermined threshold value. For example, in some embodiments, a storage location corresponding to a particular data source, i.e. a Webpage, may result in a high use score. As such, the system may automatically begin to refresh the storage location more frequently by increasing the query frequency described in block 302.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for intelligent processing of distributed data, the method comprising:
receiving, from one or more distributed computing systems, an enterprise dataset, wherein the enterprise dataset comprises at least one of a product review and a product rating;
converting the enterprise dataset to a standardized format;
storing the enterprise dataset in one or more storage locations based on a characteristic of the enterprise dataset and an output of a first artificial intelligence engine, wherein the characteristic of the enterprise dataset comprises at least one of a product category and a data source category and wherein each of the one or more storage locations is associated with a unique end-point device;
generating, via a second artificial intelligence engine, a use score associated with the one or more storage locations, wherein the use score is based on at least an access frequency and an access duration of the one or more storage locations; and
automatically refreshing the one or more storage locations based on determining that the use score exceeds a predetermined threshold value.

2. The method of claim 1, wherein receiving, from the one or more distributed computing systems, the enterprise dataset further comprises querying the one or more distributed computing systems based on an output of the second artificial intelligence engine.

3. The method of claim 1, wherein converting the enterprise dataset to a standardized data format further comprises identifying one or more data subsets contained within the enterprise dataset and using the first artificial intelligence engine to assign the one or more data subsets to one or more data categories and wherein the method further comprises:
storing the enterprise datasets in the one or more storage locations based on the one or more data categories.

4. The method of claim 1, wherein the method further comprises:
providing the one or more distributed computing systems with remote access to the one or more storage locations via a network; and
monitoring, via the second artificial intelligence engine, usage data from the one or more distributed computing systems, wherein the usage data is associated with remote access of the one or more storage locations.

5. A computer program product for intelligent processing of distributed data, the computer program product comprising a non-transitory computer-readable medium comprising code causing an apparatus to:
receive, from one or more distributed computing systems, an enterprise dataset, wherein the enterprise dataset comprises at least one of a product review and a product rating;
convert the enterprise dataset to a standardized format;
store the enterprise dataset in one or more storage locations based on a characteristic of the enterprise dataset and an output of a first artificial intelligence engine, wherein the characteristic of the enterprise dataset comprises at least one of a product category and a data source category and wherein each of the one or more storage locations is associated with a unique end-point device;
generate, via a second artificial intelligence engine, a use score associated with the one or more storage locations, wherein the use score is based on at least an access frequency and an access duration of the one or more storage locations; and
automatically refresh the one or more storage locations based on determining that the use score exceeds a predetermined threshold value.

6. The computer program product of claim 5, wherein receiving, from the one or more distributed computing systems, the enterprise dataset further comprises querying the one or more distributed computing systems based on an output of the second artificial intelligence engine.

7. The computer program product of claim 5, wherein converting the enterprise dataset to a standardized data format further comprises identifying one or more data subsets contained within the enterprise dataset and using the first artificial intelligence engine to assign the one or more data subsets to one or more data categories.

8. The computer program product of claim 7, wherein the at least one processor is further configured to store the enterprise datasets in the one or more storage locations based on the one or more data categories.

9. The computer program product of claim 5, wherein the apparatus is further configured to provide the one or more distributed computing systems with remote access to the one or more storage locations via a network.

10. The computer program product of claim 9, wherein the apparatus is further configured to:
monitor, via the second artificial intelligence engine, usage data from the one or more distributed computing systems, wherein the usage data is associated with remote access of the one or more storage locations.

11. The computer program product of claim 10, wherein the use score associated with the one or more storage locations is generated based on the usage data.

12. The computer program product of claim 5, wherein automatically refreshing the one or more storage locations based on the use score further comprises increasing a refresh frequency based on a value of the use score.

13. A system for intelligent processing of distributed data, the system comprising:
at least one non-transitory storage device; and
at least one processor coupled to the at least one non-transitory storage device, wherein the at least one processor is configured to:
receive, from one or more distributed computing systems, an enterprise dataset, wherein the enterprise dataset comprises at least one of a product review and a product rating;
convert the enterprise dataset to a standardized format;
store the enterprise dataset in one or more storage locations based on a characteristic of the enterprise dataset and an output of a first artificial intelligence engine, wherein the characteristic of the enterprise dataset comprises at least one of a product category and a data source category and wherein each of the one or more storage locations is associated with a unique end-point device;
generate, via a second artificial intelligence engine, a use score associated with the one or more storage locations, wherein the use score is based on at least an access frequency and an access duration of the one or more storage locations; and
automatically refresh the one or more storage locations based on determining that the use score exceeds a predetermined threshold value.

14. The system of claim 13, wherein receiving, from the one or more distributed computing systems, the enterprise dataset further comprises querying the one or more distributed computing systems based on an output of the second artificial intelligence engine.

15. The system of claim 13, wherein converting the enterprise dataset to a standardized data format further comprises identifying one or more data subsets contained within the enterprise dataset and using the first artificial intelligence engine to assign the one or more data subsets to one or more data categories.

16. The system of claim 15, wherein the at least one processor is further configured to store the enterprise datasets in the one or more storage locations based on the one or more data categories.

17. The system of claim 1, wherein the at least one processor is further configured to provide the one or more distributed computing systems with remote access to the one or more storage locations via a network.

18. The system of claim 17, wherein the at least one processor is further configured to:
 monitor, via the second artificial intelligence engine, usage data from the one or more distributed computing systems, wherein the usage data is associated with remote access of the one or more storage locations.

19. The system of claim 18, wherein the use score associated with the one or more storage locations is generated based on the usage data.

20. The system of claim 1, wherein automatically refreshing the one or more storage locations based on the use score further comprises increasing a refresh frequency based on a value of the use score.

\* \* \* \* \*